Aug. 27, 1935.  M. L. BOWMAN  2,012,655
FRUIT CLEANING MACHINE
Filed Jan. 11, 1932  2 Sheets-Sheet 1
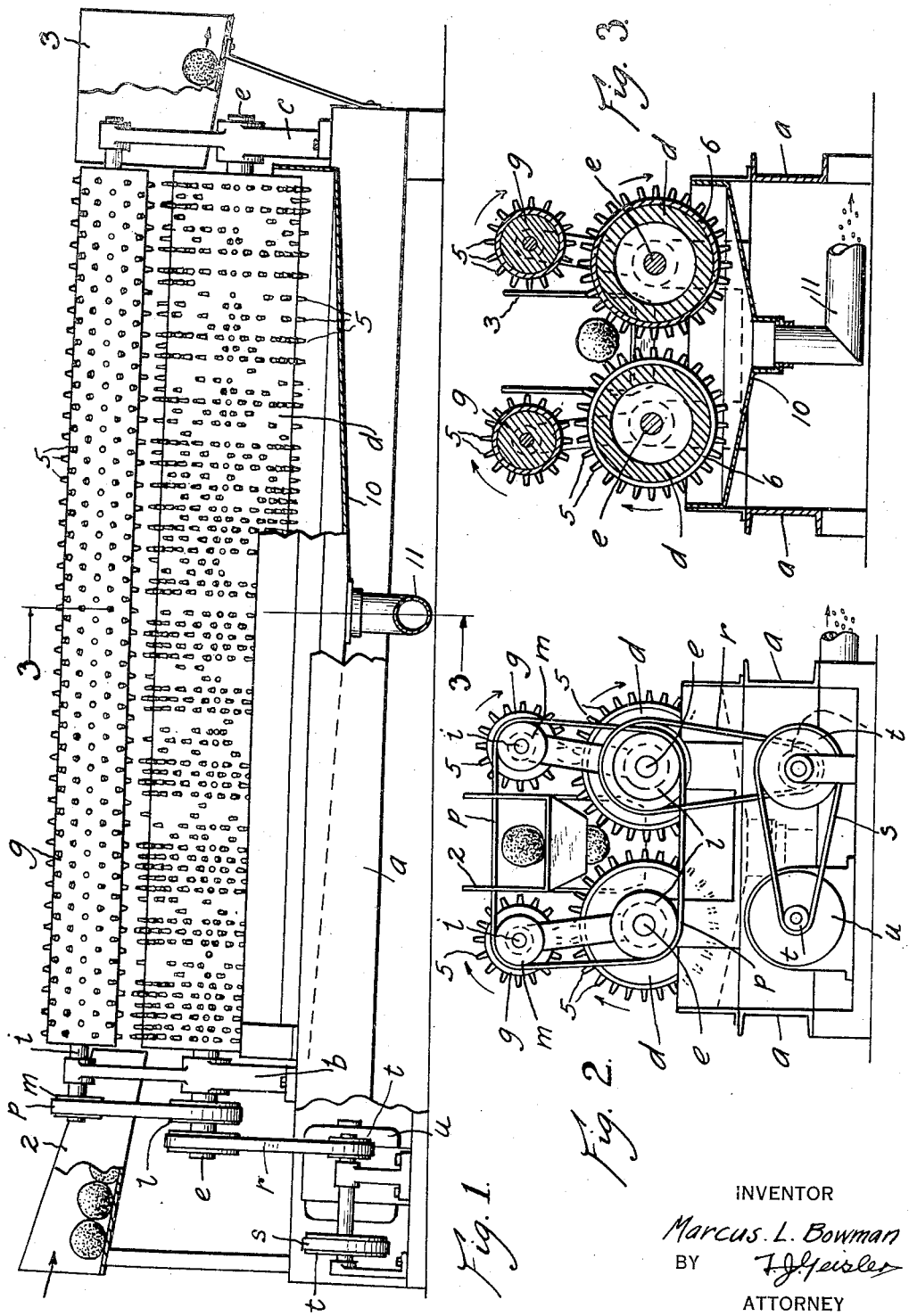
INVENTOR
Marcus. L. Bowman
BY
ATTORNEY Aug. 27, 1935.  M. L. BOWMAN  2,012,655
FRUIT CLEANING MACHINE
Filed Jan. 11, 1932    2 Sheets-Sheet 2
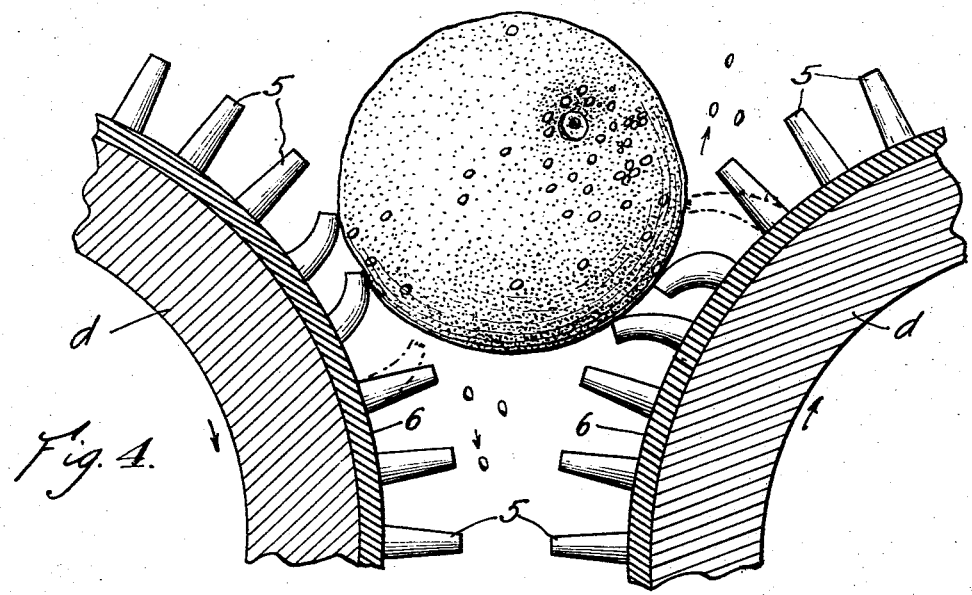
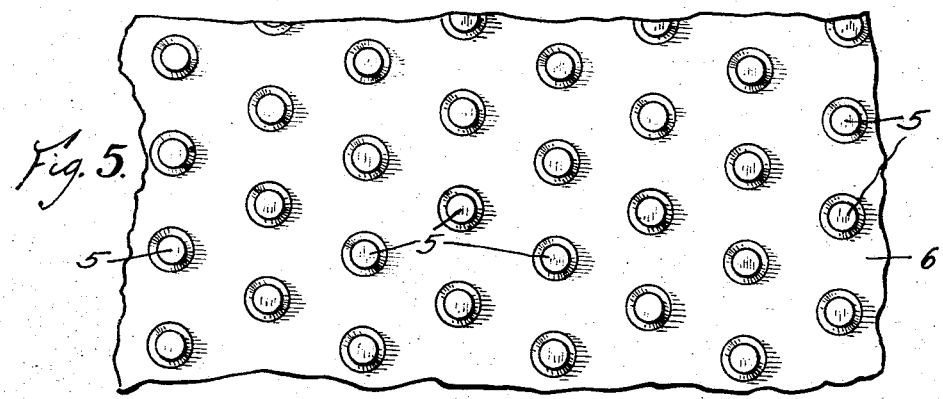
INVENTOR
Marcus L. Bowman
BY
ATTORNEY Patented Aug. 27, 1935

2,012,655

UNITED STATES PATENT OFFICE 2,012,655

FRUIT CLEANING MACHINE

Marcus L. Bowman, Portland, Oreg., assignor to Peter Kolimbot

Application January 11, 1932, Serial No. 585,923

5 Claims. (Cl. 146—202)

This application is filed to cover subject matter related to that of my application filed December 21, 1928, Serial No. 327,586.

My invention has for its object the providing of an efficient machine for removing scale from the skin of citrous fruits; also serving to clean fruits and vegetables.

In the growing and packing of citrous fruits, as lemons, and oranges, a portion of the crop is commonly found to be infected with a parasitic larvæ, commonly called "scale", which deposits itself on the skins of the fruit, giving the oranges "a speckled appearance". The appearance of the fruit is thus affected and hence its marketability reduced.

Further, since the marketing of such infected fruits tends to spread the parasite, statutes have been enacted prohibiting the shipping of the scaly fruit from one state to another. Consequently, the scaly fruit must be culled out and destroyed at considerable loss.

It is found in such fruits that the portion of the skin covered by the scale has not developed as the other surface, so that the scale lies in a slight or shallow depression, and, in order to remove the scale, it must be literally picked out, and cannot be brushed or washed off.

A further object of my invention is to provide a machine capable of rapidly and effectively descaling citrous fruits without injury to the skin or marring the appearance of the fruit; in other words, to provide a machine adapted to rapidly and efficiently pick out the scale from the depression in the skin of the fruit in which it lies without abrading or otherwise injuring the skin.

Incidentally, my descaling machine serves to polish and clean the skin of the fruit of dust and dirt (and other surface discolorations) which it acquires while on the trees and during the picking operation, and affecting its appearance and its marketability.

A further object of my invention is to provide a simple machine composed of but few parts and relatively inexpensive to make.

The details of my machine with regard to its construction and operation are hereinafter fully set forth with reference to the accompanying drawings.

In the drawings:

Fig. 1 shows a side elevation of my fruit cleaning machine with portions broken away to disclose the driving means and the other details of construction;

Fig. 2 shows an elevation of the receiving end of my machine and illustrates the construction and relative arrangement of the fruit cleaning elements and the resilient spurs carried thereby;

Fig. 3 shows a section of my machine taken on the line 3—3 of Fig. 1 and further illustrates the arrangement and construction of the fruit cleaning elements and the resilient spurs;

Fig. 4 shows an enlarged fragmentary section of the fruit cleaning elements shown in Fig. 3 and illustrates an orange being operated upon by the resilient spurs to remove the scale;

Fig. 5 shows an enlarged detached plan view of a portion of the base sheet carrying the resilient spurs and further illustrates their relative arrangement;

Referring now to Figures 1, 2 and 3, I will describe one embodiment of my machine comprising an elongate base $a$ provided with upright standards $b$, $c$ at each end, upon which are carried the fruit cleaning elements of my machine. Such cleaning elements comprise parallel, longitudinally arranged rolls $d$, $d$ journaled in said standards $b$, $c$ on the projecting shaft ends $e$. The rolls are spaced apart somewhat less than the average diameter of the fruit to be operated upon, see Fig. 4, and in any event far enough apart to permit the independent rotation of the rolls, and form a trough for carrying the fruit between them.

A hopper 2 for the fruit is provided at the receiving end of the machine adapted to discharge the fruit one at a time into the trough formed between the rolls $d$, $d$. A discharge spout 3 is provided at the other ends of the rolls for discharging the fruit after it is operated upon into suitable receptacles or onto the packing table, as may be desirable.

The fruit is caused to travel forward on the said rolls $d$, $d$ by the pressure of the fruit entering from the hopper 2, or, if desirable, the machine may be slightly inclined toward the discharge end and to cause the travel of the fruit by gravity, as shown in Fig. 1.

The rolls $d$, $d$ are provided with radially projecting resilient rubber spurs or projections 5, preferably truncated cones, approximately ¾ of an inch in length and spaced about ½ of an inch apart. Such spurs are preferably made integral with a rubber base sheet 6, and thus are adapted to be conveniently mounted on the periphery of the said rolls.

Secondary rolls g, g may be provided, journaled in the standards b, c above the rolls d, d on the projecting ends of their shafts i, and preferably are of less diameter and are spaced apart farther than the rolls d, d and serve principally as guides for the fruit as it moves between the rolls d, d.

Driving means for the rolls d, d and g, g are provided comprising pulleys l, m mounted on the shafts e, i respectively, and a belt p is mounted over their exterior sides. One of the rolls d is driven by belts r, s and pulleys t from a suitable motor u.

Operation

The fruit is received one at a time on the trough formed between the primary rolls d, d from the hopper 2 and as it travels forward in a single line, it is rotated by the rotation of the rols d, d; and is thus maintained in continuous motion and every portion is brought into contact with the said spurs 5.

The spurs, being resilient and of substantial length, bend over or flex as they first come into contact with the fruit and then as the further rotation of the rolls move the spurs out of contact with it and as the pressure of the spurs is released, the spring or snap back to normal radial position and in so doing rub off any scale lying in its depression in their path; such action being facilitated by the natural abrasive surface of the rubber.

In this form of my invention, I preferably provide both the rolls d, d with resilient rubber spurs to insure a thorough cleaning and descaling of the fruit, but it may be deemed sufficient to provide one such roll d with spurs, and to provide other means such as a plane roll or the like for holding the fruit in contact with the roll bearing the spurs; however, such, in my opinion, tends to decrease the efficiency of the machine.

Further, the fruit is rolled about by the rotation of the rolls d, d during its forward travel through the machine, and comes into contact with the large number of the spurs and every portion of the skin is operated upon, not only to remove all the scale, but also to polish the surface of the fruit and clean off any dirt that may cling to it, thus improving its appearance and hence its marketability.

I do not confine myself to any particular form of the rubber spurs 5, since much depends upon the composition of the rubber from which said spurs are made, but it is essential that the spurs be made of such form and have such inherent resiliency that their tips will support the fruit, being deflected by the weight of the fruit imposed thereon, and that each spur tip have a reflex action when relieved of the weight of the fruit, whereby the spurs tend to snap against the fruit and thus dislodge scale and other foreign matter from the skin of the fruit.

A trough 10 is provided beneath the rolls d, d adapted to catch the dirt and particles cleaned from the fruit and any convenient means of disposing of it, as a suction conduit 11 may be provided.

I claim:

1. In a fruit cleaning machine the combination of a pair of horizontal, rotated rolls, each studded on its periphery with resilient, radial spurs set closely together to receive the fruit on their tips and so that the fruit cannot enter between said spurs, whereby deflection of the spurs by the impact of the fruit thereon causes a reflex snap of the spurs on the fruit's skin dislodging therefrom adhering matter, said rolls arranged so that the spurs carried by them, respectively, will not interfere, horizontal, rotated guard rolls also studded with resilient spurs arranged substantially as those of the first mentioned rolls, said guard rolls arranged above said first mentioned rolls, respectively, whereby to intercept the flight of such fruit as tends to be projected out of the machine by the first mentioned rolls.

2. A fruit cleaning machine including members rotating in the same direction and spaced apart to provide a fruit-receiving trough between their oppositely traveling adjacent surfaces, and relatively spaced resilient spurs projecting radially from the peripheral surface of each member, said spurs in form and inherent resiliency serving to support the fruit on their tips with such tips deflected by the weight of the fruit imposed thereon, the tips of the spurs under the presence of the fruit in the trough and the rotation of the members being deflected in a direction opposite to the travel of the members, each spur being inherently active to resume a straight position by movement toward the fruit when relieved of fruit pressure, whereby the spurs tend to snap toward and against the fruit to dislodge scale and other foreign matter from the skin of the fruit.

3. A fruit cleaning machine including members rotating in the same direction and spaced apart to provide a fruit-receiving trough between their oppositely traveling adjacent surfaces, and relatively spaced resilient rubber-like spurs projecting radially from the peripheral surface of each member, said spurs in form and inherent resiliency serving to support the fruit on their tips with such tips deflected by the weight of the fruit imposed thereon, the tips of the spurs under the presence of fruit in the trough and the rotation of the members being deflected in a direction opposite to the travel of the members, each spur being inherently active to resume a straight position by movement toward the fruit when relieved of fruit pressure, whereby the spurs tend to snap toward and against the fruit to dislodge scale and other foreign matter from the skin of the fruit.

4. A fruit cleaning machine comprising rollers rotating in the same direction and spaced apart to provide a fruit-receiving trough adjacent their oppositely traveling adjacent surfaces, and rubber-like spurs extending radially from the peripheral surface of each roller and moving transversely of the trough in opposite directions without interference, said rubber-like spurs being inherently resilient and in a form to provide tips for supporting the fruit with the tips deflected by the weight of the fruit imposed thereon in a direction opposite to the travel of the member carrying the tips, the inherent resiliency of each spur tip causing such tip to have a reflex action toward the fruit when relieved of the weight of the fruit, with such reflex action causing the tips to snap against the fruit to dislodge scale and other foreign matter from the skin of the fruit.

5. A fruit cleaning machine comprising rollers rotating in the same direction and spaced apart to provide a fruit-receiving trough between their oppositely traveling adjacent surfaces, and rubber-like spurs extending radially from the peripheral surfaces of each roller and moving transversely of the trough in opposite directions without interference, the spurs of each roller being approximately three-fourths of an inch in length and spaced approximately one-half of an inch apart on the surface of each roller, said rubber-like spurs being of inherent resiliency and in form to provide fruit-supporting tips capable of deflection under the weight of the fruit imposed thereon, each tip having a reflex action when relieved of the weight of the fruit to cause the tip to snap against the fruit and dislodge scale and other foreign matter from the skin of the fruit.

MARCUS L. BOWMAN.